Jan. 1, 1924
G. L. CABOT
SUPPLY MEANS FOR AIRCRAFT
Filed May 9, 1918
1,479,221
2 Sheets-Sheet 2
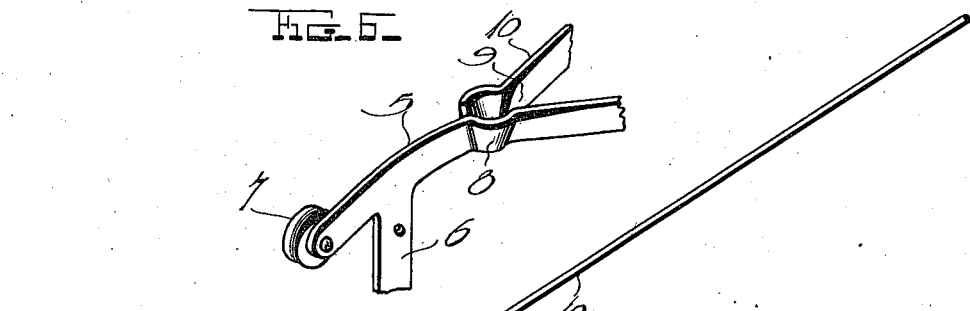
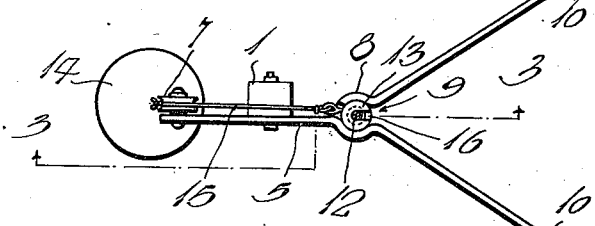
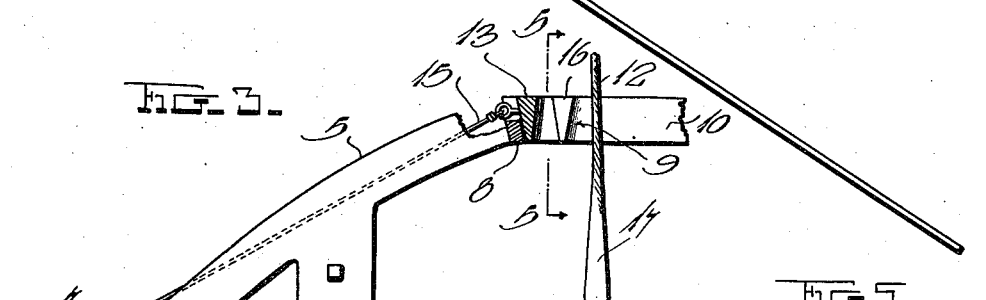
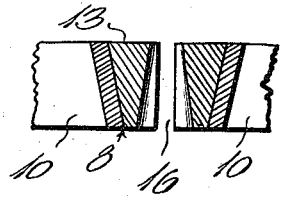
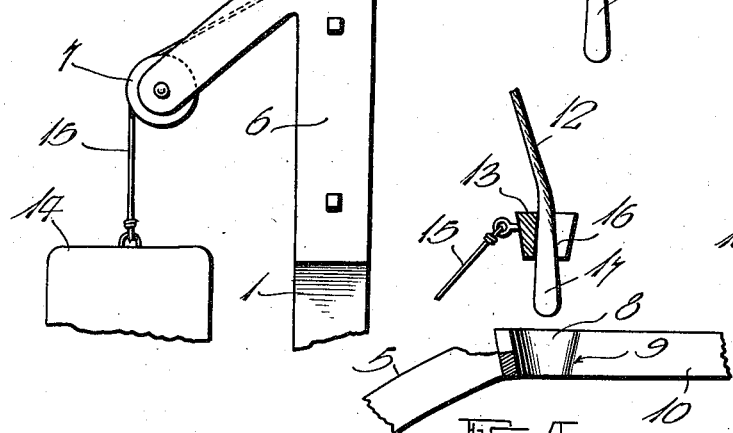
Inventor
Godfrey L. Cabot
By H. B. Willson &co
Attorneys
Witness
H. Woodard Patented Jan. 1, 1924.

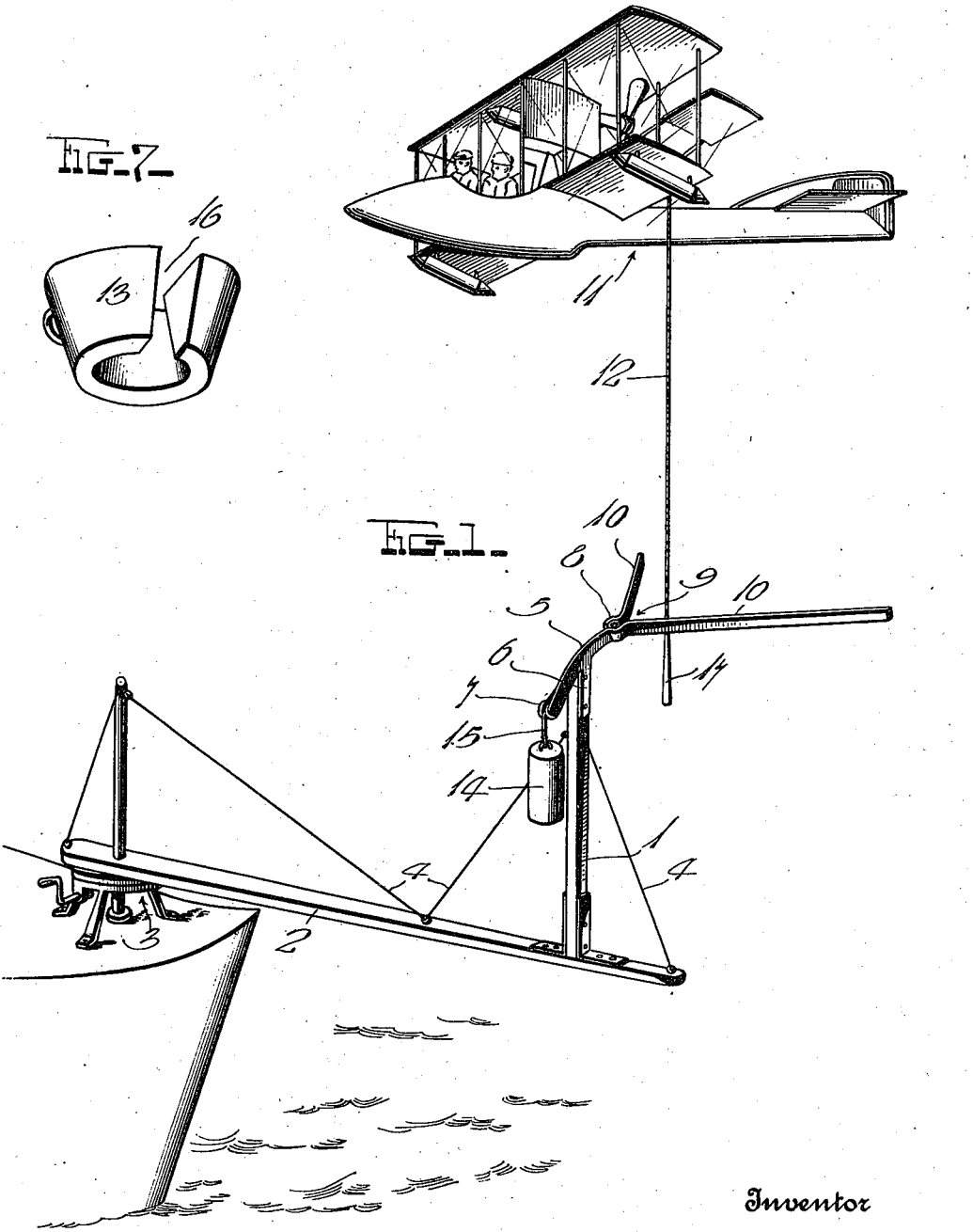

1,479,221

UNITED STATES PATENT OFFICE.

GODFREY L. CABOT, OF BOSTON, MASSACHUSETTS.

SUPPLY MEANS FOR AIRCRAFT.

Application filed May 9, 1918. Serial No. 233,520.

*To all whom it may concern:*

Be it known that I, GODFREY L. CABOT, a citizen of the United States, residing at Boston, in the county of Suffolk and State of Massachusetts, have invented certain new and useful Improvements in Supply Means for Aircraft; and I do declare the following to be a full, clear, and exact description of the invention, such as will enable others skilled in the art to which it appertains to make and use the same.

My invention has for its object to provide a comparatively simple yet highly efficient and durable arrangement of parts for furnishing fuel and other supplies to all sorts of aircraft while in flight; and with this object in view, the invention resides in the novel features of construction and unique combinations of parts hereinafter fully described and claimed, and shown in the accompanying drawings wherein:

Figure 1 is a perspective view showing the manner in which the supply raising cable of the aircraft is guided into the throat of the anchor to which the supplies are attached;

Fig. 2 is a top plan view showing the cable in horizontal section positioned in the throat of said anchor;

Fig. 3 is a side elevation with parts in section on the plane of the line 3—3 of Fig 2, showing the cable of the airship about to enter the throat of the supply anchor;

Fig. 4 is a view similar to Fig. 3 but showing the manner in which the cable picks up the anchor member;

Fig. 5 is a detail transverse section on the plane of the line 5—5 of Fig. 3;

Fig. 6 is a perspective view of the socket for holding the supply anchor, showing also adjacent parts; and Fig. 7 is a perspective view of the anchor.

In the drawings above briefly described, the numeral 1 designates a vertical standard which may rise from the ground, from the deck of a vessel, from a boom 2 carried by a ship, or from any other suitable support. When the boom 2 is used for supporting the standard 1, suitable means 3 will be employed for swinging said boom to the most advantageous location and suitable guy wires or the like 4 will be provided to prevent sagging of the boom and lateral tilting of the standard. It is of course understood also that regardless of the manner in which the standard 1 is mounted, it will be suitably braced.

A cross arm 5 is shown provided with a vertical shank 6 suitably secured to the upper end of the standard 1, one end of said arm having a support 7 preferably in the form of a pulley for a purpose to appear, while the other end of said arm is equipped with a socket 8 open at one side as seen at 9, a pair of divergent arms 10 being provided on opposite sides of the opening, the free ends of said arms being spaced apart sufficiently to permit the pilot of the aircraft 11 to readily tow the depending cable 12 between said arms while the machine is in motion.

The socket 8 receives therein a supply anchor 13 to which the supplies 14 are attached by a flexible tie 15, said tie passing over the socket and also extending over the pulley 7, the tie in question being pendent from said pulley and supporting the supplies 14 on its lower end. The anchor 13 is in the form of a plug as shown clearly in the drawings, said plug and the socket 8 being preferably tapered downwardly to insure tight engagement yet easy disengagement, said plug having a throat 16 into which the cable 12 is guided by the arms 10. The cable in question is provided with an upwardly tapered lower extremity 17 which prevents slippage of the cable from the throat 16 and said throat is by preference correspondingly tapered as shown clearly in Figs. 3, 4, 5 and 7, thus insuring that when once the cable is received in the throat, it cannot accidentally slip therefrom.

Reception of the cable 12 in the throat 16 pulls the supply anchor 13 from the socket 8 and raises the flexible tie 15 from said socket and the support 7 (see Fig. 4), thus picking up the supplies 14 without in any manner impeding the speed of the aircraft. The cable may be raised and lowered by hand or suitable mechanical means and since such details are comparatively unimportant, they are not illustrated and described.

From the foregoing, taken in connection with the accompanying drawings, it will be obvious that my invention will be of great advantage for supplying aircraft with fuel, ammunition, bombs and supplies of all sorts. It may also be pointed out that the invention is of particular merit for picking up mail sacks along aerial mail routes without the necessity of stopping the aerial carrier. Since probably the best results are obtained from the arrangement shown and described, such arrangement is by preference employed, but within the scope of the invention as claimed, numerous minor changes may well be made.

I claim:

1. Supply means for aircraft comprising an anchor to which the supplies are attached, said anchor having a cable-receiving throat, means for normally holding said anchor but permitting ascent thereof, a cable depending from the aircraft, means for guiding said cable into the throat of said anchor, and means for preventing slippage of said cable from said throat.

2. Supply means for aircraft comprising an anchor, a flexible tie for connecting the supplies to said anchor, means for normally holding said anchor but permitting ascent thereof, said flexible tie passing over said holding means, a cable depending from the aircraft, said anchor having a throat adapted to receive said cable, means for guiding said cable into said throat, and means for preventing slippage of said cable from said throat.

3. Supply means for aircraft comprising a fixed socket open at one side, an anchor to which the supplies are attached, said anchor being in the form of a plug receivable in said socket and movable upwardly therefrom, said plug having a cable receiving throat disposed at said open side of the socket, a cable depending from the aircraft, means for guiding said cable into said throat, and means for preventing slippage of said cable from said throat.

4. A structure as specified in claim 3, said socket and plug being tapered downwardly to insure snug but easily released engagement.

5. A structure as specified in claim 1, said slippage preventing means consisting of an upwardly tapered terminal on said cable.

6. A structure as specified in claim 3, said slippage preventing means consisting of an upwardly tapered terminal on said cable.

7. A structure as specified in claim 1, said throat being tapered upwardly and said slippage preventing means consisting of a correspondingly tapered terminal on said cable.

8. A structure as specified in claim 3, said throat being tapered upwardly and said slippage preventing means consisting of a correspondingly tapered terminal on said cable.

9. Supply means for aircraft comprising an anchor for the supplies, a flexible tie for attaching the supplies to said anchor, means for holding said anchor but permitting ascent thereof, said tie passing over said holding means, a support adjacent to said holding means over which said tie passes and from which it depends, a cable depending from the aircraft, means for guiding said cable to said anchor, said anchor having a throat to receive said cable, and means for preventing slippage of said cable from said throat.

10. A structure as specified in claim 9, and an arm extending from said holding means, and carrying said support.

11. Supply means for aircraft comprising an anchor for the supplies consisting of a plug having a cable receiving throat, a fixed socket receiving said plug and open on one side adjacent said throat, said plug being movable upwardly from the socket, a flexible tie for attaching the supplies to said plug, said tie passing over said socket, an arm extending laterally from said socket and having a support over which said tie passes and from which it depends, a cable depending from the aircraft, means for guiding said cable into said throat, and means for preventing slippage of said cable from said throat.

12. Supply means for aircraft comprising an anchor for the supplies consisting of a plug having a cable receiving throat, a fixed socket receiving said plug and open on one side adjacent said throat, said plug being movable upwardly from the socket, a flexible tie for attaching the supplies to said plug, said tie passing over said socket, an arm extending laterally from said socket and having a support over which said tie passes and from which it depends, a cable depending from the aircraft, a pair of divergent arms extending from said socket for guiding said cable into said throat, and means for preventing slippage of said cable from said throat.

13. Supply means for aircraft comprising a pair of divergent arms, an anchor to which the supplies are attached, means for holding said anchor at the closely spaced ends of said arms, said anchor being movable upwardly from said holding means, and a cable depending from the aircraft and adapted to be guided to said anchor by said arms, said cable and anchor having coacting means for connecting them.

14. A structure as specified in claim 13, said anchor being in the form of a plug and said anchor-holding means consisting of a socket snugly receiving said plug.

15. A structure as specified in claim 13, said anchor being in the form of a plug and said anchor-holding means consisting of a socket in which said plug is received, said plug and socket being tapered downwardly to insure snug engagement but easy disengagement.

16. Supply means for aircraft comprising an anchor to which the supplies are attached, said anchor having a cable-receiving throat, means for normally holding said anchor but permitting detachment thereof, a cable depending from the aircraft, means for guiding said cable into the throat of said anchor, and means for preventing disengagement of said cable from said throat while under tension.

17. In a supply means for aircraft, an anchor member to which the supplies are attached, means for removably holding said anchor member, a cable depending from the aircraft for picking up said anchor member and the supplies, and means for guiding said cable to said anchor member.

18. In a supply means for aircraft, a pair of converging guides, an anchor member to which the supplies are attached, means for removably holding said anchor member at the closely spaced ends of said guides, and a cable depending from the aircraft and adapted to be guided to said anchor member by said guides, means being provided for connecting said anchor member and cable upon engagement of the latter with the former.

19. In a supply means for aircraft, a pair of converging guides, an anchor member to which the supplies are attached, means for removably holding said anchor member at the closely spaced ends of said guides, and a cable depending from the aircraft and adapted to be guided to said anchor member by said guides, said anchor member having a throat to receive said cable, and the latter being provided with means to prevent longitudinal sliding thereof from said throat.

20. In a supply means for aircraft, an anchor member to which the supplies are attached, means for removably holding said anchor member, a cable depending from the aircraft, said anchor member having a throat to receive said cable, and means for guiding said cable into said throat, provision being made to prevent longitudinal slippage of said cable from said throat.

21. In a supply means for aircraft, an anchor member to which the supplies are attached, said anchor member having an upwardly tapered throat, means for removably holding said anchor member, a cable depending from the aircraft, means for guiding said cable into said throat, and an enlargement on said cable to seat snugly in said throat.

22. Aircraft supply means having an anchor member to which the supplies are attached and a cable on the aircraft for picking up said anchor member and supplies, said anchor member being downwardly tapered, and holding means for said anchor member similarly tapered to permit easy removal of said anchor member from said holding means.

23. In an apparatus of the kind described, an article carrying device having means for seizing a trailing device, such as a rope or cable, and means arranged to guide the trailing device into operative relationship with the seizing means, substantially as set forth.

24. In an apparatus of the kind described, an article carrying device having means adapted to seize and hold a trailing device, such as a rope or cable depending from an aircraft, and two converging guides adapted to receive between them the trailing device and to guide the trailing device into operative relationship with said seizing means, substantially as set forth.

25. In an apparatus of the kind described, supporting means adapted to support in operative position an article carrying device of a type having means for seizing and holding a trailing device, such as a rope or cable depending from an aircraft, and means for guiding the trailing device into operative relationship with an article carrying device operatively supported on said supporting means, substantially as set forth.

26. In an apparatus of the kind described, means adapted to support in operative position an article carrying device of a type having means for seizing and holding a trailing device, such as a rope or cable depending from an aircraft, and two converging guides adapted to receive between them the trailing device and to guide the trailing device into operative relationship with the article carrying device when the latter is operatively supported on said supporting means, substantially as set forth.

In testimony whereof I have hereunto set my hand.

GODFREY L. CABOT.